United States Patent
Khare et al.

(10) Patent No.: US 11,127,043 B2
(45) Date of Patent: Sep. 21, 2021

(54) SYSTEM AND A METHOD FOR ENHANCING AUDIENCE REACH AND BRAND PROMOTION THROUGH TELEVISION

(71) Applicant: SUREWAVES MEDIATECH PRIVATE LIMITED, Bangalore (IN)

(72) Inventors: Rajendra Kumar Khare, Bangalore (IN); Manajit Rath, Bangalore (IN); Kishore Adekhandi Krishnamurthy, Bangalore (IN)

(73) Assignee: SUREWAVES MEDIATECH PRIVATE LIMITED, Bangalore (IN)

( * ) Notice: Subject to any disclaimer, the term of this patent is extended or adjusted under 35 U.S.C. 154(b) by 168 days.

(21) Appl. No.: 15/173,685

(22) Filed: Jun. 5, 2016

(65) Prior Publication Data

US 2016/0358221 A1   Dec. 8, 2016

(51) Int. Cl.
*G06Q 30/00* (2012.01)
*G06Q 30/02* (2012.01)
(Continued)

(52) U.S. Cl.
CPC ..... *G06Q 30/0269* (2013.01); *G06Q 30/0263* (2013.01); *G06Q 50/01* (2013.01);
(Continued)

(58) Field of Classification Search
CPC .......... G06Q 30/0277; G06Q 30/0269; G06Q 30/02; G06Q 30/0263; G06Q 50/01;
(Continued)

(56) References Cited

U.S. PATENT DOCUMENTS

2011/0283304 A1* 11/2011 Roberts .................. H04H 60/72
725/9
2012/0124625 A1* 5/2012 Foote ...................... G06F 16/78
725/42

(Continued)

OTHER PUBLICATIONS

Duan; Personalization of media and its attention service applications; IEEE 2008; pp. 1153-1156; 2008.*

(Continued)

*Primary Examiner* — Radu Andrei
(74) *Attorney, Agent, or Firm* — Barry Choobin; Patent 360LLC

(57) ABSTRACT

The embodiments herein provide a system and a method for enhancing audience reach and brand promotion in social media marketing by including social media messages like Twitter® messages into television channels. The method effectively promotes brands, sale offers, discount deals, and social contests to the people who are beyond internet's reach. The system automatically collects Twitter® messages posted by the users and telecasts the messages on selected TV channels as banners while viewers watch programs on TV. The system generates positive brand awareness among people by telecasting the tweets having the most positive reviews about a particular brand or event. The system detects and telecasts the most relevant tweets of a particular event or a brand using hashtags created in the tweets for brands or event names.

3 Claims, 3 Drawing Sheets

(51) Int. Cl.
  *G06Q 50/00* (2012.01)
  *H04N 21/4788* (2011.01)
  *H04N 21/81* (2011.01)
  *H04N 21/258* (2011.01)
  *H04N 21/488* (2011.01)

(52) U.S. Cl.
  CPC ... *H04N 21/25883* (2013.01); *H04N 21/4788* (2013.01); *H04N 21/4886* (2013.01); *H04N 21/812* (2013.01)

(58) Field of Classification Search
  CPC ......... H04N 21/25883; H04N 21/4788; H04N 21/4886; H04N 21/812
  See application file for complete search history.

(56) References Cited

U.S. PATENT DOCUMENTS

| | | | |
|---|---|---|---|
| 2012/0131610 A1* | 5/2012 | Fernandez Gutierrez | H04N 21/812 725/34 |
| 2013/0018957 A1* | 1/2013 | Parnaby | G06Q 50/01 709/204 |
| 2013/0107117 A1* | 5/2013 | Fitzgerald | H04N 21/6118 348/468 |
| 2013/0268357 A1* | 10/2013 | Heath | G06Q 30/02 705/14.53 |
| 2013/0284029 A1* | 10/2013 | Reed | G06Q 30/0241 99/280 |
| 2013/0339852 A1* | 12/2013 | Poornachandran | G06F 3/0481 715/716 |
| 2014/0067916 A1* | 3/2014 | Park | H04L 67/42 709/203 |
| 2014/0068692 A1* | 3/2014 | Archibong | H04N 21/23424 725/116 |
| 2015/0106731 A1* | 4/2015 | Matas | H04L 51/32 715/744 |
| 2016/0012465 A1* | 1/2016 | Sharp | G06Q 20/386 705/14.17 |
| 2016/0042075 A1* | 2/2016 | Brett | G06F 16/9535 707/754 |
| 2016/0227291 A1* | 8/2016 | Shaw | H04N 21/812 |
| 2017/0235839 A1* | 8/2017 | Shaw | G06F 16/68 707/709 |

OTHER PUBLICATIONS

Rugero; Leveraging Cross-Domain Social Media Analytics; IEEE 2015; pp. 10-21; 2015.*

* cited by examiner

SYSTEM AND A METHOD FOR ENHANCING AUDIENCE REACH AND BRAND PROMOTION THROUGH TELEVISION

CROSS-REFERENCE TO RELATED APPLICATION

This application claims the priority of the Indian Provisional Patent Application with serial number 2839/CHE/2015 filed on Jun. 5, 2105 with the title "A SYSTEM AND A METHOD FOR AMPLIFYING AUDIENCE REACH AND BRAND PROMOTION THROUGH TELEVISION", and the consents of which is incorporated in entirety as reference herein.

BACKGROUND

Technical Field

The embodiments herein is generally related to social media marketing. The embodiments herein is particularly related to a system and a method for amplifying audience reach and brand promotion in social media marketing through Television (TV). The embodiments herein is more particularly related to a system and a method for promoting brands, sale offers, discount, deals, and social contests to people who are beyond internet's reach by incorporating social media messages like Twitter® messages into television channels.

Description of the Related Art

The growth of television in the developing world over the last two decades has been extraordinary. Beyond providing entertainment, television vastly increases both the availability of information about the outside world and exposure to other ways of life. Thus, television continues to be the largest medium, in many parts of the world, for delivering information in an effective manner to a large captive audience at right time.

On the other side, the use of social networking websites have become prevalent in modern society. The social networking websites have revolutionized the way people communicate and share information. Many popular websites have hundreds of millions of members or followers. 'Twitter®' is a real-time social media service which is successfully embedded itself deeply in the daily lives of people. Twitter® allows the users to share information by posting short messages of length 140 characters known as 'Tweets'. In general, 'Tweets' include @mention to other users, hashtags, external links, or simply regular text. Twitter® allows the users to organize the people they follow into lists of businesses or personalities which are related. For example, a user can list all the charities they follow into a single list, for easy reference. Twitter® also allows advertisers to purchase Tweets for reaching a wider group of people or to spark engagement from their existing followers. Thus, Twitter® provides an effective means for brands to directly engage with their audiences and control brand perception.

Most of the brand owners or business people use internet and social mediums such as Facebook® and Twitter® for marketing their products, announcing promotions, and for new product launches. For example, some of the ways to market brands on the internet is blog writing, social book marking sites, and social news or article marketing. However, these marketing techniques focus only on people who are using the social web services. As a result, the brand owners or business people are unable to reach the audience who are beyond internet's reach.

Further, internet review sites such as TripAdvisor, Yelp, and Google+ have become an avenue for disgruntled guests and competing businesses to write unfounded and untrue negative reviews. These negative opinions have tendency to spread more and results in significant loss for businesses, organizations, and individuals.

Hence there is a need for a system and a method for increasing or amplifying audience reach in social media marketing by incorporating social media messages like Twitter® messages into television channels. Further, there is also a need for a system and a method for effectively promoting brands, sales, and social contests to the people who are beyond internet's reach. Furthermore, there is also need for a system and a method for generating positive brand awareness among the people by telecasting positive social media messages on television channels.

The above mentioned shortcomings, disadvantages and problems are addressed herein and which will be understood by reading and studying the following specification.

Objects of the Embodiments Herein

The primary object of the embodiments herein is to provide a system and a method for enhancing/amplifying audience reach and brand promotion in social media marketing by incorporating social media messages like Twitter® messages into television channels.

Another object of the embodiments herein is to provide a system and a method for effectively promoting brands, sale offers, discount deals, and social contests to people who are beyond internet's reach.

Yet another object of the embodiments herein is to provide a system and a method for generating positive brand awareness among the people by telecasting positive social media messages like Twitter® messages on television channels.

Yet another object of the embodiments herein is to provide a system and a method for providing a geo targeting ability while providing the social media messages thereby posting the social media messages posted on a given geographical/regional location on the programs telecast on the given geographical location or regions.

These and other objects and advantages of the embodiments herein will become readily apparent from the following detailed description taken in conjunction with the accompanying drawings.

SUMMARY

The various embodiments herein provide a system and a method for enhancing/amplifying audience reach and brand promotion in social media marketing by incorporating social media messages like Twitter® messages into television channels. The system and method effectively promotes brands, sale offers, discount, deals, and social contests to the people who are beyond internet's reach.

According to one embodiment herein, a system is provided for amplifying/enhancing audience reach and brand promotion by including social media messages into television (TV) channels. The system comprises a collection module, a content recognition and filtering module, a profile management module and a telecasting module.

According to one embodiment herein, the collection module is configured to collect the social media messages posted by the users on social media websites. The content recognition and filtering module is configured to detect and filter the social media messages having positive reviews regarding a brand or an event. The profile management module is configured to manage profile information of the users posting the social media messages on the social media websites. The profile information includes a profile picture, age and city name of the user. The telecasting module is configured to amplify/enhance audience reach and brand promotion by telecasting the social media messages as banners on screens of TV channels along with a profile information of the users.

According to one embodiment herein, the social media websites includes twitter, Facebook, Google+ etc.

According to one embodiment herein, the collection module is configured to collect the social media messages related to brand promotions.

According to one embodiment herein, the content recognition and filtering module is configured to detect the social media messages having positive reviews using hashtags in the social media messages.

According to one embodiment herein, the content recognition and filtering module is configured to filter the social media messages includes sale offers, discount deals, brands, and social contests posted by the users.

According to one embodiment herein, the content recognition and filtering module is further configured to filter out spam from the detected social media messages based on a relevancy of information present in the social media messages with a desired brand or event name.

According to one embodiment herein, the telecasting module is configured to telecast the social media messages as banners on TV channels while viewers watch the TV programs on TV channels.

According to one embodiment, herein, the telecasting module is configured to telecast the profile information of the user posting social media messages containing positive reviews about a particular brand or an event.

According to one embodiment herein, the telecasting module is configured for providing a geo targeting tag or function/ability while providing the social media messages thereby posting the social media messages posted on a given geographical/regional location on the programs telecast on the given geographical location or regions.

These and other aspects of the embodiments herein will be better appreciated and understood when considered in conjunction with the following description and the accompanying drawings. If should be understood, however, that the following descriptions, while indicating the preferred embodiments and numerous specific details thereof, are given by way of an illustration and not of a limitation. Many changes and modifications may be made within the scope of the embodiments herein without departing from the spirit thereof, and the embodiments herein include all such modifications.

BRIEF DESCRIPTION OF THE DRAWINGS

The other objects, features and advantages will occur to those skilled in the art from the following description of the preferred embodiment and the accompanying drawings in which.

Figure 1:
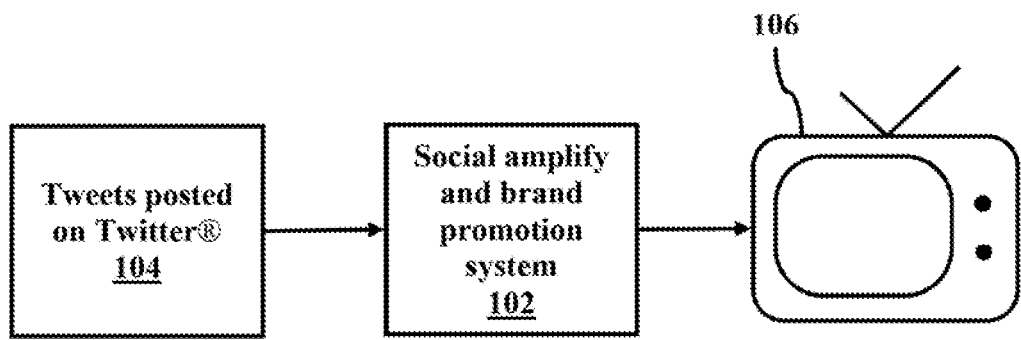
FIG. 1 illustrates a block diagram of a system for amplifying or enhancing an audience reach and brand promotion in social media marketing through TV, according to one embodiment herein.

Although the specific features of the embodiments herein are shown in some drawings and not in others. This is done for convenience only as each feature may be combined with any or all of the other features in accordance with the embodiments herein.

DETAILED DESCRIPTION OF THE EMBODIMENTS HEREIN

In the following detailed description, a reference is made to the accompanying drawings that form a part hereof, and in which the specific embodiments that may be practiced is shown by way of illustration. These embodiments are described in sufficient detail to enable those skilled in the art to practice the embodiments and it is to be understood that the logical, mechanical and other changes may be made without departing from the scope of the embodiments. The following detailed description is therefore not to be taken in a limiting sense.

The various embodiments herein provide a system and a method for amplifying audience reach and brand promotion in social media marketing by incorporating social media messages like Twitter® messages into television channels. The system and method effectively promotes brands, sale offers, discount deals, and social contests to the people who are beyond internet's reach.

According to one embodiment herein, a system is provided for amplifying/enhancing audience reach and brand promotion by including social media messages into television (TV) channels. The system comprises a collection module, a content recognition and filtering module, a profile management module and a telecasting module.

According to one embodiment herein, the collection module is configured to collect the social media messages posted by the users on social media websites. The content recognition and filtering module is configured to detect and filter the social media messages having positive reviews regarding a brand or an event. The profile management module is configured to manage profile information of the users posting the social media messages on the social media websites. The profile information includes a profile picture, age and city name of the user. The telecasting module is configured to amplify/enhance audience reach and brand promotion by telecasting the social media messages as banners on screens of TV channels along with a profile information of the users.

According to one embodiment herein, the social media websites includes twitter, Facebook, Google+ etc.

According to one embodiment herein, the collection module is configured to collect the social media messages related to brand promotions.

According to one embodiment herein, the content recognition and filtering module is configured to detect the social media messages having positive reviews using hashtags in the social media messages.

According to one embodiment herein, the content recognition and filtering module is configured to filter the social media messages includes sale offers, discount deals, brands, and social contests posted by the users.

According to one embodiment herein, the content recognition and filtering module is further configured to filter out spam from the detected social media messages based on a relevancy of information present in the social media messages with a desired brand or event name.

According to one embodiment herein, the telecasting module is configured to telecast the social media messages as banners on TV channels while viewers watch the TV programs on TV channels.

According to one embodiment herein, the telecasting module is configured to telecast the profile information of the user posting social media messages containing positive reviews about a particular brand or an event.

According to one embodiment herein, the telecasting module is configured for providing a geo targeting ability while providing the social media messages thereby posting the social media messages posted on a given geographical/regional location on the programs telecast on the given geographical location or regions.

The collection module automatically collects Twitter® messages posted by users on Twitter® and further telecasts the messages on selected TV channels. The messages are telecasted as banners on TV channels while viewers watch programs on TV. For example, a user posts a tweet regarding a flash sale on Twitter®. The social media enhancement and brand promotion system automatically collects the flash sale tweet and telecasts it on TV channels as a banner while viewers watch the programs on TV. Thus, the system enhances/amplifies the audience reach and increases sales which in turn results in a business growth.

According to one embodiment herein, the social media enhancement and brand promotion system generates positive brand awareness among the people in society. The content recognition and filtering module filters all messages posted by the users on Twitter® and detects the tweets or messages having positive reviews regarding a brand or an event. The telecasting module telecasts the tweets as banners on screens of selected TV channels along with user's profile information. The profile information comprises profile picture, age and city name of the user. For example, a user posts a tweet containing positive review regarding a brand on Twitter®, then the social media enhancement and brand promotion system automatically detects the tweet and telecasts the tweet on selected television channels along with user profile information.

According to one embodiment herein, the social media enhancement and brand promotion system detects the tweets relating to a particular brand or an event by using the hashtags created in the tweets. Further, the system automatically filters out the spam tweets based on a relevancy of information present in the tweets with a desired brand or event. After filtering, the most relevant tweets are telecasted on TV channels which improve a brand awareness among TV audience.

According to one embodiment herein, the telecasting module is configured for providing a geo targeting tag/ability while providing the social media messages thereby posting the social media messages posted on a given geographical/regional location on the programs telecast on the given geographical location or regions.

FIG. 1 illustrates a block diagram of a system for enhancing/amplifying audience reach and brand promotion in the social media marketing through TV, according to one embodiment herein. With respect to FIG. 1, the system comprises a social media amplify and brand promotion platform 102 which enhances/amplifies audience reach and brand promotions by incorporating the Twitter® messages 104 into television channels. The system 102 automatically collects the Twitter® messages or tweets 104 regarding the brand promotions. Further, the system filters the tweets related to sale offers, discount deals, brands, and social contests that are posted by the users on Twitter®. Further, the system 102 telecasts the tweets on selected TV channels as banners while viewers watch programs on TV 106.

The system 102 generates a positive brand awareness among the viewers by telecasting the tweets having most positive reviews about a particular brand or event on TV channels. Further, the system 102 filters and telecasts the most relevant tweets of a particular event or a brand using hashtags created in the tweets by the Twitter® users.

Figure 2:
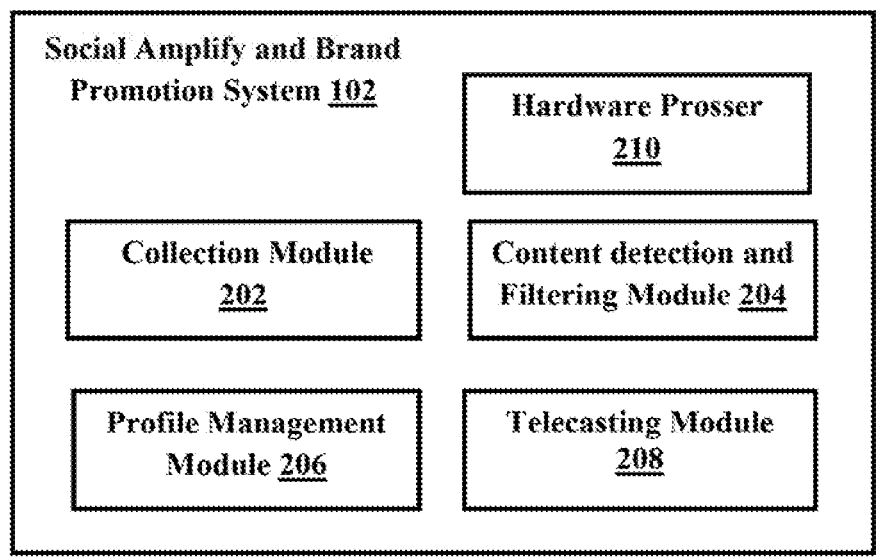
FIG. 2 illustrates a block diagram of a system for social media enhancement and brand promotion, according to one embodiment herein.

FIG. 2 illustrates a block diagram of a system for social media enhancement and brand promotion system 102, according to one embodiment herein. With respect to FIG. 2, the social media enhancement and brand promotion system 102 comprises a collection module 202, a content detection and filtering module 204, a profile management module 206, and a telecasting module 208. The collection module 202 is run on a hardware processor 210 and configured to collect social media messages posted by user on different social media websites. The social media websites includes but are not limited to Twitter®, Facebook®, Google+® and the like. The social media messages include all the tweets posted by the users on Twitter®.

The content recognition and filtering module 204 is run on a hardware processor 210 and configured to detect and filter the social media messages having positive reviews regarding a brand or an event. The content recognition and filtering module 204 is run on a hardware processor 210 and configured to detect the social media messages having positive reviews using hashtag in the social media messages. The content recognition and filtering module 204 is run on a hardware processor 210 and configured to filter the social media messages includes sale offers, discount deals, brands, and social contests posted by the users. The content recognition and filtering module 204 is further run on a hardware processor 210 and configured to filter out spam from the detected social media messages based on relevancy of information present in the social media messages with a desired brand or event name.

For example, the content detection and filtering module 204 is run on a hardware processor 210 and configured to check all the collected tweets and detect the tweets containing positive information about a particular brand or an event. The content detection and filtering module 204 is also run on a hardware processor 210 and configured to detect the tweets which are more relevant to a particular brand or an event using hashtags created in the tweets. Further, the content detection and filtering module 204 is run on a hardware processor 210 and configured to filter out the spam from the detected tweets based on a relevancy of information present in the tweets with a desired brand or event name.

The profile management module 206 is run on a hardware processor 210 and configured to manage the profile information of the users posting the social media messages on the social media websites. The profile information includes profile picture, age and city name of the user. The profile management module 206 is run on a hardware processor 210 and configured to manage the profile information of all users who have posted the tweets containing the positive reviews about a particular brand or an event. The profile information is telecasted on TV channels along with the tweets posted by the users. The telecasting module 208 is run on a hardware processor 210 and configured to enhance the audience reach and brand promotion by telecasting social media messages as banners on screens of TV channels along with profile information of the users. The telecasting module 208 is run on a hardware processor 210 and configured to telecast the tweets on selected TV channels as banners while the viewers watch the programs on TV 106. The telecasting module 208 is run on a hardware processor 210 and configured to telecast the profile information of the user posting the social media messages containing the positive reviews about a particular brand or an event.

According to one embodiment herein, the telecasting module is configured for providing a geo targeting ability while providing the social media messages thereby posting the social media messages posted on a given geographical/regional location on the programs telecast on the given geographical location or regions. For example, the viewers of TV programs in Chennai region is provided with the social media messaged posted by the users in the Chennai region only.

Figure 3:
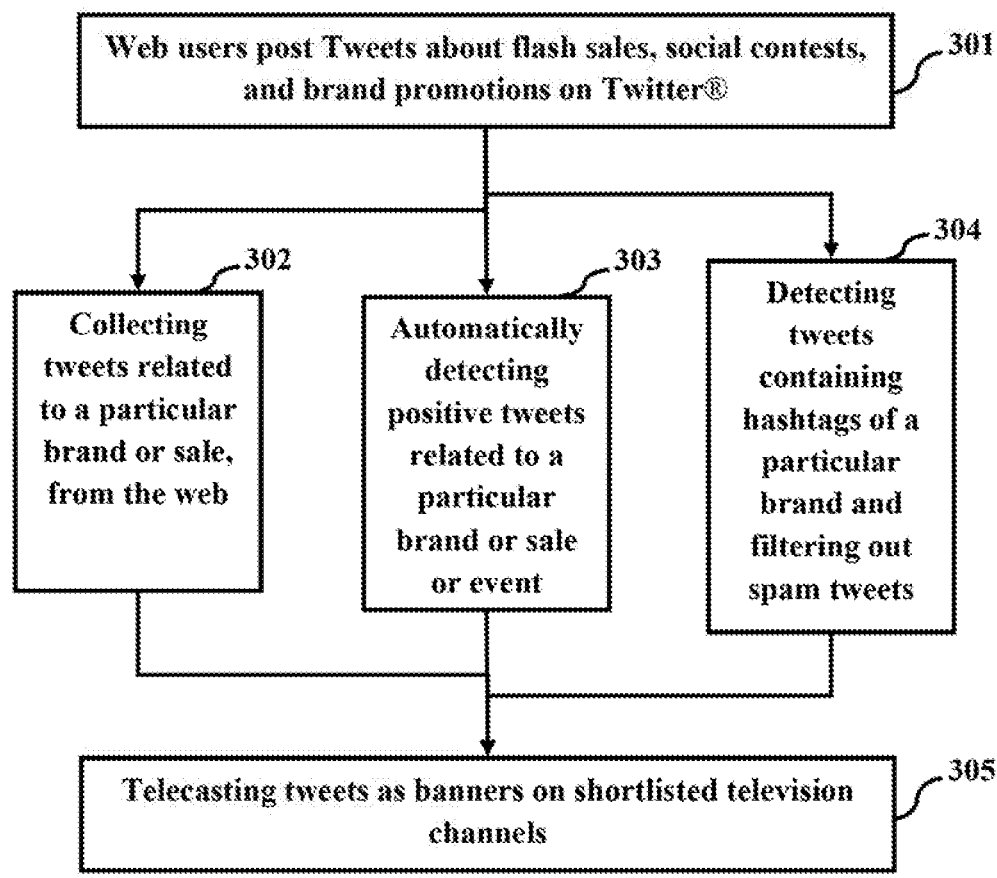
FIG. 3 illustrates a flow chart explaining a method for enhancing audience reach and brand promotion in social media marketing by including Twitter® messages into TV, according to one embodiment herein.

FIG. 3 illustrates a flow chart explaining a method for enhancing the audience reach and brand promotion in a social media marketing by including the Twitter® messages into TV, according to one embodiment herein. The Web users post the tweets related to flash sales, social contests, and brand promotions by signing into their Twitter® accounts (301). The social media enhancement and brand promotion system automatically collects the Twitter® messages posted by the users regarding the sales or offers or discount deals or brand promotions or social contest (302). Further, the collected tweets are telecasted on TV channels as a banner while the viewers watch the TV programs on TV (305). For example, a brand owner posts a tweet regarding his new car launch on Twitter®. The social media enhancement and brand promotion system automatically collects the tweets and telecasts the same on TV channels as a banner while the viewers watch the programs on TV. Thus, the method effectively amplifies audience reach and promotes brands, sale offers, discount deals, and social contests to the people who are beyond internet's reach.

The social media enhancement and brand promotion system generates the positive brand awareness among the people by telecasting the tweets having positive reviews regarding a brand or company. The content detection and filtering module is configured to filter all tweets posted by the users on Twitter® and detects the tweets having positive reviews related to a particular brand or sale or an event (303). Further, the telecasting module is configured to telecast the detected tweets as banners on TV channels along with user's profile information such as profile picture, age and city name of the user (305).

The content detection and filtering module is also configured to filter the relevant tweets by using the hashtags present in the tweets. For example, a brand owner creates a hashtag to his sale as "# FestivalSale" and posts a tweet on Twitter®. The users on Twitter® includes hashtag to the sale while posting their opinion regarding the brand. The social media enhancement and brand promotion system is configured to automatically detect the tweets relevant to FestivalSale using the hashtags. Further, the content detection and filtering module is configured to filter out spam tweets based on relevancy of information present in the tweets (304). After filtering, the most relevant tweets are telecasted on TV channels to improve brand awareness among the TV audience (305).

The embodiments herein provides an effective system and method for promoting sales among audience who are beyond the internet reach. The present system improves brand royalty, customer insights, brand awareness, and sales performance in business. The present system generates positive awareness, about a brand, among the people which is impossible through existing online mediums.

The foregoing description of the specific embodiments will so fully reveal the general nature of the embodiments herein that others can, by applying current knowledge, readily modify and/or adapt for various applications such specific embodiments without, departing from the generic concept, and, therefore, such adaptations and modifications should and are intended to be comprehended within the meaning and range of equivalents of the disclosed embodiments.

It is to be understood that the phraseology or terminology employed herein is for the purpose of description and not of limitation. Therefore, while the embodiments herein have been described in terms of preferred embodiments, those skilled in the art will recognize that the embodiments herein can be practiced with modifications.

What is claimed is:

1. A computerized system having memory stored with a plurality of instructions executed on a hardware processor for amplifying audience reach and brand promotion through television for users beyond internet reach using social media messages on screens of television channels, through one or more algorithms/applications, the system comprises:

a hardware processor;

a data collection module stored with instructions that are run on the hardware processor to collect a plurality of social media messages posted by a plurality of users on a plurality of social media websites through an algorithm based on the instructions stored in memory;

a content recognition and filtering module stored with instructions that are run on the hardware processor to detect a plurality of social media messages having positive reviews regarding a brand or an event using hashtags, through an algorithm or software application based on the instructions stored in memory;

a profile management module stored with instructions that are run on the hardware processor to collect or retrieve a profile information of the plurality of users posting the plurality of social media messages on the plurality of social media websites through an algorithm/application based on the instructions stored in memory, and wherein the profile information of the users posting the plurality of social media messages includes profile pictures, age and city name of the user posting the social media messages; and a telecast module stored with instructions that are run on the hardware processor to telecast the plurality of social media messages as banners on the screen of TV channels along with the profile information of the users posting the social media messages to television audience who are beyond internet reach, through an application/algorithm based on the instructions stored in memory;

wherein the content recognition and filtering module is run on the hardware processor and configured to filter the plurality of social media messages related to sale offers, discounts deals, brands and social contents posted by the users, through an algorithm/application based on the instructions stored in memory, and wherein the content recognition and filtering module is run on the hardware processor and configured to filter out spam from the detected plurality of social media messages based on a relevancy of information present in the plurality of social media messages with a desired brand or event name, through an algorithm/software application, and wherein the content recognition and filtering module is run on the hardware processor and configured to detect the plurality of social media messages having positive reviews through an algorithm/software application, based on the content and hash tags in the plurality of social media messages, and wherein the telecasting module is run on the hardware processor and configured to provide a geo targeting tag to telecast the social media messages posted on a given geographical/regional location by the users on the same geographical/regional location to the television viewers of the same geographical regions on television programs telecast on the same geographical/regional location only through an algorithm/software application, and wherein the telecasting module is configured to telecast plurality of social media messages as banners on TV channels while viewers watch programs on the TV channels along with the profile information of the users posting the social media messages, through an algorithm/software application, and wherein the telecasting module is run on the hardware processor and configured to telecast the profile information of the user posting social media messages containing positive reviews about a particular brand or event through an algorithm/software application, and wherein the telecast module is configured to automatically collect and telecasts flash sale tweets on TV channels as a banner through an algorithm/software application, while viewers watch the programs on TV.

2. The system according to claim 1, wherein the plurality of social media websites includes Twitter, Facebook, Linkedin, Google+.

3. The system according to claim 1, wherein the content recognition and filtering module is run on the hardware processor and configured to collect the plurality of social media messages related to brand promotions.

* * * * *